E. L. JOHNSON.
POTATO SEED CUTTING MACHINE.
APPLICATION FILED FEB. 20, 1922.

1,438,496.

Patented Dec. 12, 1922.
4 SHEETS—SHEET 1.

FIG-1-

Inventor
ERICK L. JOHNSON

By A. E. Carlsen
Attorney

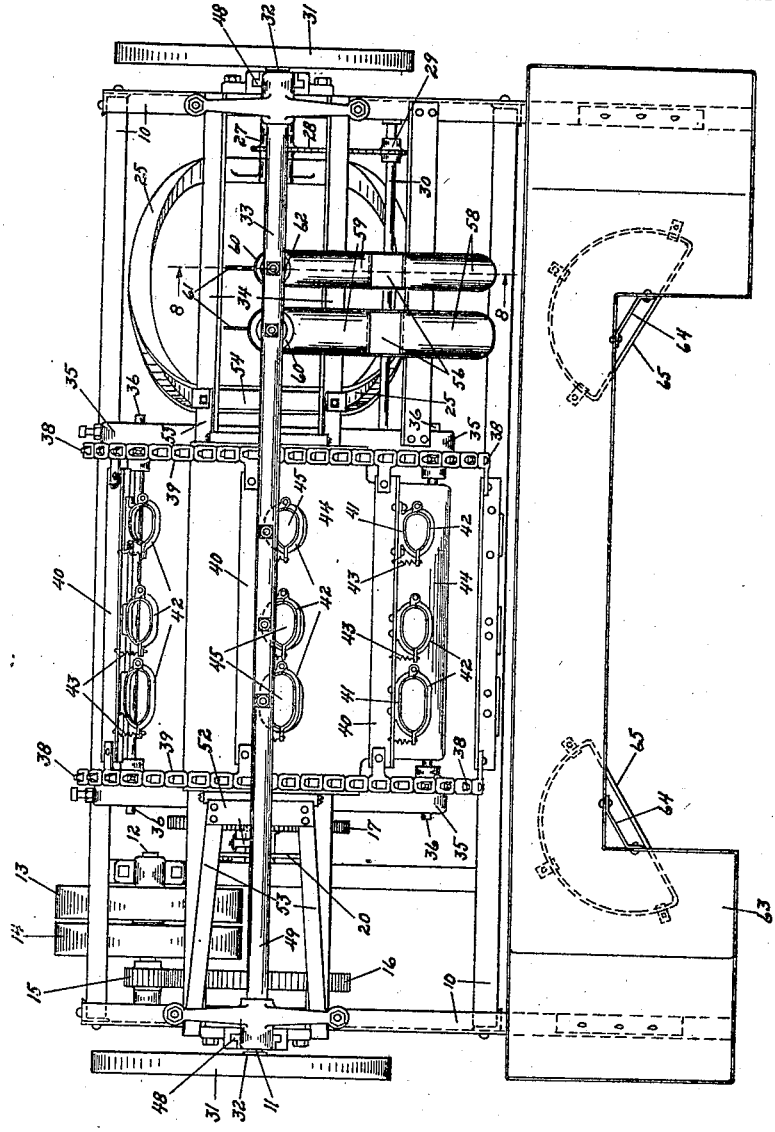

E. L. JOHNSON.
POTATO SEED CUTTING MACHINE.
APPLICATION FILED FEB. 20, 1922.
1,438,496.
Patented Dec. 12, 1922.
4 SHEETS—SHEET 3.
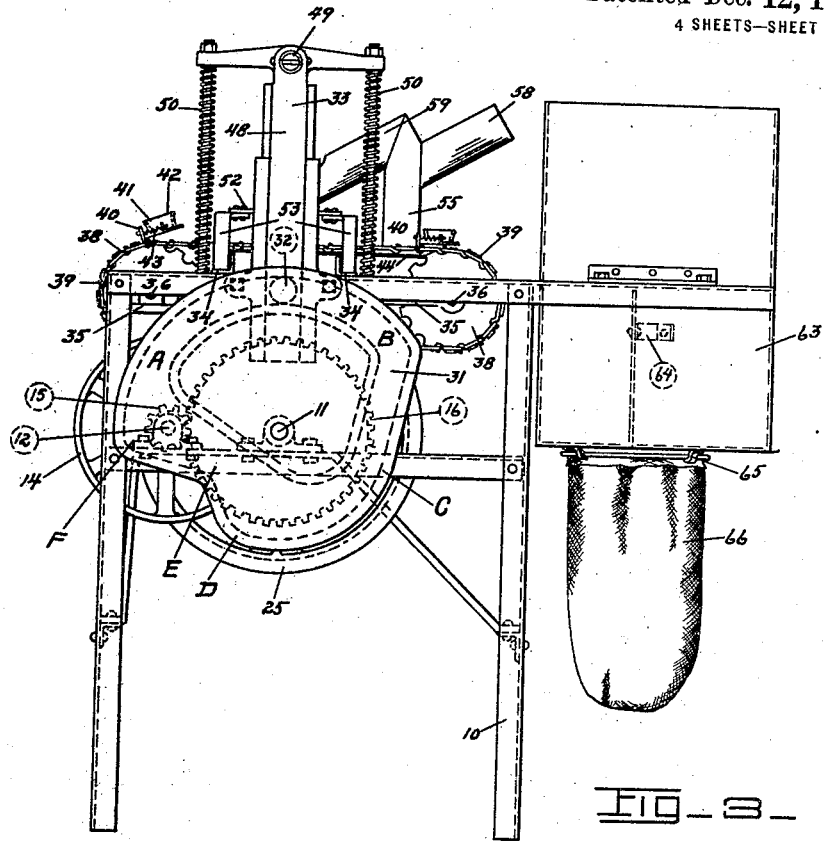
FIG-3-
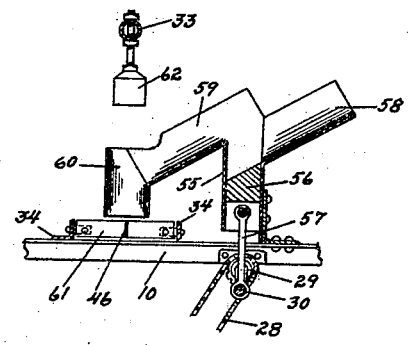
FIG-8-
Inventor
ERICK L. JOHNSON
By A. E. Carlsen
Attorney E. L. JOHNSON.
POTATO SEED CUTTING MACHINE.
APPLICATION FILED FEB. 20, 1922.
1,438,496.
Patented Dec. 12, 1922.
4 SHEETS—SHEET 4.
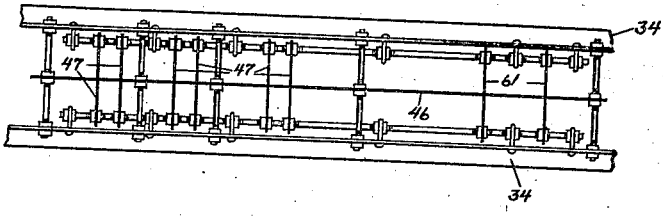
Fig-4-
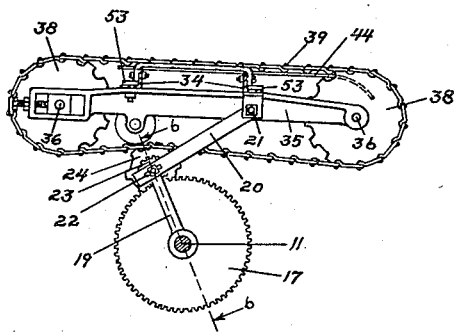
Fig-5-
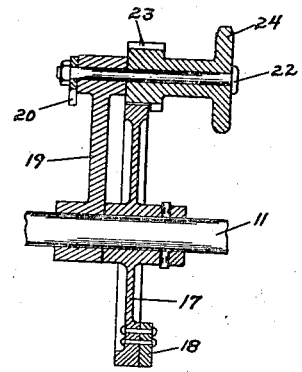
Fig-6-
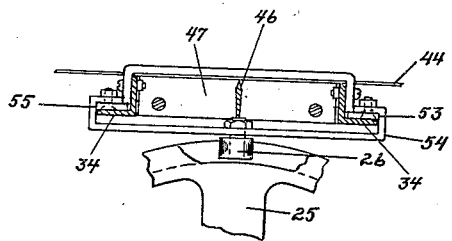
Fig-7-
Inventor
ERICK L. JOHNSON
By A. E. Carken
Attorney Patented Dec. 12, 1922.

1,438,496

UNITED STATES PATENT OFFICE.

ERICK L. JOHNSON, OF DETROIT, MINNESOTA.

POTATO-SEED-CUTTING MACHINE.

Application filed February 20, 1922. Serial No. 537,698.

*To all whom it may concern:*

Be it known that I, ERICK L. JOHNSON, a citizen of the United States, residing at Detroit, in the county of Becker and State of Minnesota, have invented certain new and useful Improvements in Potato-Seed-Cutting Machines, of which the following is a specification.

This invention relates to potato seed cutting machines and the main object is to provide an efficient and practical machine for cutting potatoes of various sizes and shapes up into substantially uniform and suitable sizes for seed purposes. Futher objects will be disclosed in the course of the following specification, will be specifically and particularly pointed out in the claims appended hereto, and are clearly illustrated in the accompanying drawings, wherein:

Fig. 1 is a front elevation of the machine, certain parts being removed or broken away for illustration purposes.

Fig. 2 is a top view of the machine.

Fig. 3 is an end elevation of the machine, as seen from the left in Fig. 2.

Fig. 4 is a fractional detail view of the cutting blades and their supports, as seen from above.

Fig. 5 is a detail view of the conveyor mechanism, as seen on the line 5—5 in Fig. 1, the clamps thereon, however, being removed.

Fig. 6 is an enlarged detail section on the line 6—6 in Fig. 5.

Fig. 7 is an enlarged detail section on the line 7—7 in Fig. 1, and,

Fig. 8 is a detail sectional view, substantially on the line 8—8 in Fig. 2.

Referring now more particularly to the drawings, and by reference characters, 10 designates the main frame of the machine in which is journaled a main shaft 11 and a drive shaft 12. The shaft 12 is provided with an idle belt pulley 13 and an active belt pulley 14, adapted to turn the shaft, and is also provided with a pinion 15 which meshes with and drives a gear 16 on the shaft 11. Thus when the machine is in operation a constant rotating motion will be imparted to the shaft 11.

A large gear 17 having a hunting tooth 18 on one side thereof is secured on the main shaft and close to it the lower end of a radius bar 19 is trunnioned on the shaft. The upper end of the bar 19 is adjustably secured (see Fig. 5) to the lower end of a link 20 whose upper end is secured to a rigid part of the main frame, as at 21. A stud shaft 22 (see especially Fig. 6) is secured in the upper end of the radius bar 19 and on it is rotatably mounted a member having a gear pinion 23 at one end and a sprocket 24 at the other end. The pinion 23 meshes with the gear 17 but it is somewhat wider so that the hunting tooth 18 may mesh with and move the pinion 23 once for every revolution it makes. Two of the teeth in the pinion 23 are partly cut away (see Fig. 6) where the gear 17 would normally engage, so that when that part of the pinion comes to the gear side the pinion remains motionless until the hunting tooth 18 again reaches the pinion and starts it on another revolution. Thus an intermittent rotating movement is imparted to the sprocket pinion 24, and the determination of the timing when said movement shall be executed can be slightly adjusted by moving the radius bar 19 slightly up or down on the link 20.

On the right end portion of the shaft 11 is secured a cam channel member 25, in which a follower 26 is caused to reciprocate, in a longitudinal direction with respect to the machine, and actuate a horizontally movable cutting knife and mechanism, soon to be described. Next to the member 25, and on the shaft 11, is also secured a sprocket pinion 27, which, through the medium of the chain 28 drives a pinion 29 on a crank shaft 30. At the extreme ends of the main shaft 11 are a pair of cam plates 31, having irregular flanges, between which cam followers 32 operate, and by so doing impart a variable, vertical reciprocating motion to a plunger frame 33.

A pair of parallel angle irons 34 extend from end to end and are rigidly secured to the main frame. A pair of cross beams 35, secured transversely under the channel irons, have bearings at their ends in which are journaled two conveyor shafts 36. Each shaft 36 has a sprocket gear 38 at each end and the respective gears on both shafts are in turn connected by sprocket chains 39, one of which meshes with and is driven by the pinion 24. A series (preferably about seven) of angle iron cross members 40 are secured at their ends to the sprocket chains 39, and on each of said cross members are secured three potato holding clamps, which preferably range in size so as to accommodate various sizes of potatoes. Each of said clamping members consists of a stationary jaw 41 and a hinged jaw 42 the latter being held yieldingly shut by a spring 43. A platform 44, having holes 45 is secured on top of the angle irons 34, and provides a horizontal support for the upper run of the conveyor, the holes 45 allowing the potatoes to be punched down to the cutting knives. The cutting knives mentioned are those shown in Fig. 4, and consist of a centrally arranged longitudinal knife 46 and three pair of cross knives 47, one pair for each plunger.

The plunger frame 33 consists of two vertically slidable end members 48 and a horizontal connecting beam 49, the former carrying the cam followers 32. A number of springs 50 tend to hold the frame 33 up so that the cam members 31 will act downward on the followers 32 at all times. A set of plungers 51 (see Fig. 1) are secured to the beam 49 and are so positioned and shaped that they will engage over the potatoes placed in the clamps 41, 42 (when the latter reach the proper position) and force them down through the openings 45 and knives 47 with the result that they are cut up vertically into pieces.

Means for cutting the potatoes horizontally is also provided, and consists of a knife 52 secured on the upper ends of two sliding bars 53. The lower parts of the bars 53 are slidably mounted on the angle irons, and are rigidly connected together at their other ends by a bracket 54 which carries the cam follower 26.

Near the right end of the machine is secured a pair of vertical cylinders 55 having slidably mounted therein a pair of pistons 56. Said pistons have their upper faces slanted (see Fig. 8) and are connected by connecting rods 57 to the crank of the crank shaft 30. Each chamber 55 is further provided with a receiving trough 58 and a delivering trough 59, which, when the piston 56 moves upward delivers the potato, if one there is, in the cylinder 55 to a plunger chamber 60, under which is located the longitudinal knife 46 and single cross knives 61. A plunger 62 is provided for each chamber 60 and is secured to the frame 33 so that it will punch potatoes fed into the chamber 60 down through the knives 46 and 61 for every downward movement of the plunger frame.

At the front of the machine, where the workman stands, is provided a large hopper or uncut potato pan 63 into which the potatoes to be cut are filled. The pan is lower and is narrower at its middle, as shown in Fig. 2, so that the worker can readily pick the potatoes out of the pan and insert them, according to size, in the proper part of the machine. In the two angles of the cut away or narrow part of the pan 63 are secured a couple of bracket knives 64, under which suitable bag holding means 65 holding bags 66 are secured. It is often desirable, and in some localities required, that sample seed for testing purposes be saved from potatoes cut up into seed, and with this in view the knives 64 and bags 66 are provided. Thus, as the operator is feeding the machine he may as often as necessary grip a potato in his hand and cut the end thereof off on a knife 64, the sample then falling into the bag thereunder.

The functions of the various mechanisms and the general operation of the whole machine will now be set forth more in detail.

As the clamping members 41—42 come up from the under run of the conveyor and start toward the plungers 51 the operator slips the potatoes into the clamp being of the best size for each particular potato. Any potatoes thought too small for the clamps are dropped into the troughs 58, rolling down to the pistons 56. During this time the cam followers 32 (see Fig. 3) move from positions A to B in the cam, thus not moving the frame 33 down at all. The next movement of the shaft 11 moves the pistons 56 up, so that the potatoes in the chambers 55 fall into the chambers 60, moves the filled clamps 41—42 directly over the holes 45, and brings the plunger frame 33 down so that the plungers 51 rest on top of their respective potatoes and the plungers 62 are ready to cut their respective potatoes. The followers 32 are now at position C in the cams 31. During the movement of the cams from C to D the frame 33 is motionless as this part of the cam is an arc from the center 11. During this last mentioned movement, however, the cam 25 imparts a long sweeping motion to the follower 26, thus causing the knife 52 to sweep rapidly across between the first two (or large) plungers 51 and the clamps immediately therebelow, and cut the potatoes horizontally and approximately in half.

The knife 52 now remains in its extreme right hand position until the cams 31 move the followers 32 from D to E. This movement gives a quick downward movement to the frame 33 causing all the plungers 51 and 62 to punch their potatoes through the knives 46, 47 and 61. As the followers 32 guide from E to F on the cams 31 they then allow the frame 33 to jump up to its uppermost position immediately after which the cam 25 also causes the knife 52 to swing quickly back to its idle left hand position. It will be understood that the conveyor remains motionless while the plungers 51 are engaged therein, due to the two cut away teeth in the pinion 23 which disengages the gear 17 during part of its movement, as above described.

It will also be readily understood that the above described operations are repeated continually, the operator the while feeding the potatoes into the machine until as many as desired are cut up into seed. The cut seed will fall down onto the shaft 11 and thence onto the floor or into suitable receptacles placed under the machine.

It is further understood that suitable modifications may be made in the general design and structural details of this invention, when so desired, and when such modifications come within the spirit and scope of the appended claims: Having now therefore fully shown and described my invention, what I claim to be new and desire to protect by Letters Patent is:

1. In a machine of the class described, a frame, stationary cutting knives mounted in the frame, a conveyor adapted to convey potatoes to a position adjacent the cutting knives, plungers adapted to force said potatoes through said cutting knives, and a movable knife adapted to pass between the conveyor and plungers for cutting the potatoes at right angles to the stationary cutting knives.

2. In a machine of the class described, a frame, a platform mounted on the frame and having apertures, knives secured below said apertures, means for feeding potatoes to positions over said apertures, and plungers adapted to force said potatoes down through said apertures and knives.

3. In a machine of the class described, a horizontal platform having apertures therein, vertical knives positioned below said apertures, means for feeding potatoes to and yieldingly hold them in a position over said apertures, and means for forcing said potatoes down through the knives so as to be cut thereby.

4. In a machine of the class described, a series of vertically arranged intersecting knives, means for yieldingly holding potatoes over said knives, means for cutting the potatoes horizontally while in said holding means, and means for forcing said potatoes out of the holding means and down through the vertical knives after said potatoes have first been cut horizontally.

5. In a machine of the class described, a stationary cutting device, a conveyor adapted to yieldingly hold potatoes and move them to a position adjacent the cutting device, means for intermittently actuating the conveyor so as to place potatoes in said position periodically, and means for removing the potatoes when in said stated position and forcing same through said cutting device.

6. In a machine of the class described, intersecting cutting knives arranged vertically and rigidly in the machine, clamping members arranged on a conveyor movable over the knives, said clamping members being adapted to yieldingly hold potatoes, means for intermittently actuating said conveyor so that said clamping members will at predetermined intervals remain momentarily stationary when over said knives, and plungers adapted to force said potatoes from said clamping members and down through the knives at said intervals.

7. In a machine of the class described, a cutting device, a housing arranged near the cutting device, a piston adapted to reciprocate in the housing, and a trough leading from the housing to the cutting device.

8. In a machine of the class described, a cutting device, a delivering trough leading to the cutting device, a receiving trough, a reciprocable piston arranged between said troughs and being adapted to deliver potatoes from the latter to the former.

9. In a machine of the class described, a cutting device, an inclined delivering trough adapted to deliver potatoes to the cutting device, an inclined receiving trough mounted with its lower end below the upper end of the delivering trough, and means for raising potatoes from the lower end of the receiving trough to the upper end of the delivering trough.

10. In a machine of the class described, a cutting device, a delivery trough leading to the cutting device, a reciprocal piston arranged at the receiving end of said trough, said piston having an inclined upper surface, as and for the purpose specified.

In testimony whereof I affix my signature.

ERICK L. JOHNSON.